(12) United States Patent
Schmid

(10) Patent No.: US 6,425,247 B1
(45) Date of Patent: Jul. 30, 2002

(54) METHOD FOR CONTROLLING A SUPERCHARGED INTERNAL COMBUSTION ENGINE

(75) Inventor: Wolfram Schmid, Nuertingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/806,024

(22) PCT Filed: Aug. 28, 1999

(86) PCT No.: PCT/EP99/06342

§ 371 (c)(1),
(2), (4) Date: Jul. 9, 2001

(87) PCT Pub. No.: WO00/19079

PCT Pub. Date: Apr. 6, 2000

(30) Foreign Application Priority Data

Sep. 26, 1998 (DE) .......................................... 198 44 212

(51) Int. Cl.$^7$ .............................................. F02D 23/00
(52) U.S. Cl. ............................. 60/602; 60/600; 123/564
(58) Field of Search ........................... 60/611, 600, 601, 60/602, 603, 605.1; 123/564

(56) References Cited

U.S. PATENT DOCUMENTS

| | | | |
|---|---|---|---|
| 4,660,382 A | | 4/1987 | Ueno et al. ..................... 60/602 |
| 4,702,080 A | * | 10/1987 | Ueno et al. ..................... 60/602 |
| 4,732,003 A | * | 3/1988 | Ueno et al. ..................... 60/602 |
| 5,174,119 A | | 12/1992 | Hanauer et al. ................. 60/602 |
| 5,546,795 A | | 8/1996 | Yamagishi .................... 73/118.2 |
| 5,680,763 A | | 10/1997 | Unland et al. ................. 60/602 |
| 6,058,706 A | * | 5/2000 | Aschner et al. ................ 60/600 |
| 6,220,232 B1 | * | 4/2001 | Torno et al. ................... 123/564 |

FOREIGN PATENT DOCUMENTS

| | | |
|---|---|---|
| DE | 40 25 901 | 1/1992 |
| GB | 2 318 193 | 4/1998 |

* cited by examiner

*Primary Examiner*—Thomas Denion
*Assistant Examiner*—Thai-Ba Trieu
(74) *Attorney, Agent, or Firm*—Crowell & Moring LLP

(57) ABSTRACT

A control method for a supercharged internal combustion engine wherein actual supercharging pressure values are adjusted to prescribed desired supercharging pressure values by setting a variable component and influencing the supercharging pressure of a supercharger in accordance with a prescribed control law. In order to monitor the control of supercharging pressure in a supercharged internal combustion engine with the aid of simple means and, if appropriate, to display a malfunction, use is made as control law of a PID controller, the integration component is compared in the integration element of the PID controller with a prescribed tolerance band, and a fault signal is generated if the integration component is outside the tolerance band.

20 Claims, 3 Drawing Sheets

METHOD FOR CONTROLLING A SUPER-CHARGED INTERNAL COMBUSTION ENGINE

BACKGROUND AND SUMMARY OF INVENTION

This application claims the priority of 198 44 212.2, filed in Germany on Sep. 26, 1998, and PCT/EP99/06342 filed in Europe on Aug. 28, 1999, the disclosures of which are expressly incorporated by reference herein.

The invention relates to a control method for a supercharged internal combustion engine.

German Reference DE 40 25 901 C1 discloses an exhaust gas turbocharger for an internal combustion engine which has a turbine with a turbine geometry which can be variably set via a variable turbine guide vane, and a compressor, driven by the turbine, for raising the supercharging pressure in the cylinder inlet. The turbine guide vane can be adjusted with the aid of an actuator so as to vary the active cross section of the turbine. It is possible therefore, depending on the operating state of the internal combustion engine, to implement exhaust back pressures at various levels in the section between the cylinders and the exhaust gas turbocharger, as a result of which the output of the turbine and the power of the compressor can be adjusted depending on need. The turbine guide vane is controlled to a desired supercharging pressure in accordance with prescribed characteristic lines.

In order to achieve an improvement in efficiency with simple means in a non-stationary operation of the internal combustion engine, the supercharging pressure is controlled below and above a threshold value for the exhaust back pressure in accordance with different characteristic lines. It is possible thereby to prevent the occurrence of uncontrolled pressure rises in the exhaust pipe upstream of the turbine after a positive load change during the rise in supercharging pressure. The internal combustion engine need no longer emit against a raised exhaust back pressure, and the efficiency is raised.

The supercharging pressure of such internal combustion engines is frequently adjusted to the desired value with the aid of a supercharging pressure controller implemented as a PID controller, the supercharging pressure controller applying the required control signal to an adjustable supercharger component influencing the supercharging pressure. Since the supercharging pressure substantially influences the vehicle operation in the activated drive operating mode and, in particular in the case of heavy commercial vehicles, also in engine braking operation, the functionality of the controller and/or of the components participating in the control must be regularly checked.

The invention is based on the problem of monitoring the control of supercharging pressure in a supercharged internal combustion engine with the aid of simple means and, if appropriate, displaying a malfunction.

The novel control method uses a PID controller for adjusting the desired supercharging pressure. The integration component of the PID integration element usually increases continuously with time. According to the invention, this integration component is now compared with a tolerance band which is prescribed with a tolerance value at either end as an ideal integrator mean value. If the integration component exceeds or falls below the tolerance band, a defective operating state is present, and a fault signal is produced to assist in the identification of the defective state during the controlling of the supercharged internal combustion engine. This defective state can be classified as a fault of low severity as long as only the integration component is outside the tolerance band, but otherwise the system deviation of the integration element is still approximately zero, which means the PID controller is still capable of controlling to the prescribed desired supercharging pressure value.

This method has the advantage that faults can be identified clearly and reliably in running operation without additional measures such as, for example, workshop interventions with additional test procedures.

In a particularly advantageous way, the method includes the use of a PID controller and a system deviation is detected by comparison with a limit value and used to generate a fault signal. This defective state can be classified as a severe fault, since a remaining system deviation which is not allowed to occur with the use of an integration element in the case of a correct mode of operation renders it impossible to set the desired supercharging pressure.

The combination of monitoring the integration error and the system deviation represents a complete safety concept which manages without additional outlay on hardware, such as sensors or the like, and can be implemented with a low outlay. In this case, the monitoring can be performed in two stages, firstly by checking the integration component in a first stage, and in a second stage also checking the system deviation for the case when the integration component is outside the permitted range.

In the case of a fault, a fault signal is generated and expediently input into the engine regulation and control system of the internal combustion engine. Both in the case of a fault in the first stage and in the case of a fault in the second stage, a fault signal is generated in each case, it advantageously being possible to differentiate the type of fault via specific markings of the fault signals.

The derivative-action element of the PID controller can be set to zero if appropriate. The controller reduces to a PI controller in this case.

The control method is preferably used in combination with an exhaust gas turbine with variable turbine geometry which can be used to control the supercharging pressure by adjusting the variable control device of the turbine geometry in accordance with prescribed supercharging pressure characteristic diagrams up to the setting of the desired supercharging pressure.

BRIEF DESCRIPTION OF THE DRAWINGS

Further advantages and expedient embodiments are to be gathered from the further claims, the description of the figures and the drawings, in which:

DETAILED DESCRIPTION OF THE PREFERRED EMBODIMENTS

Figure 1:
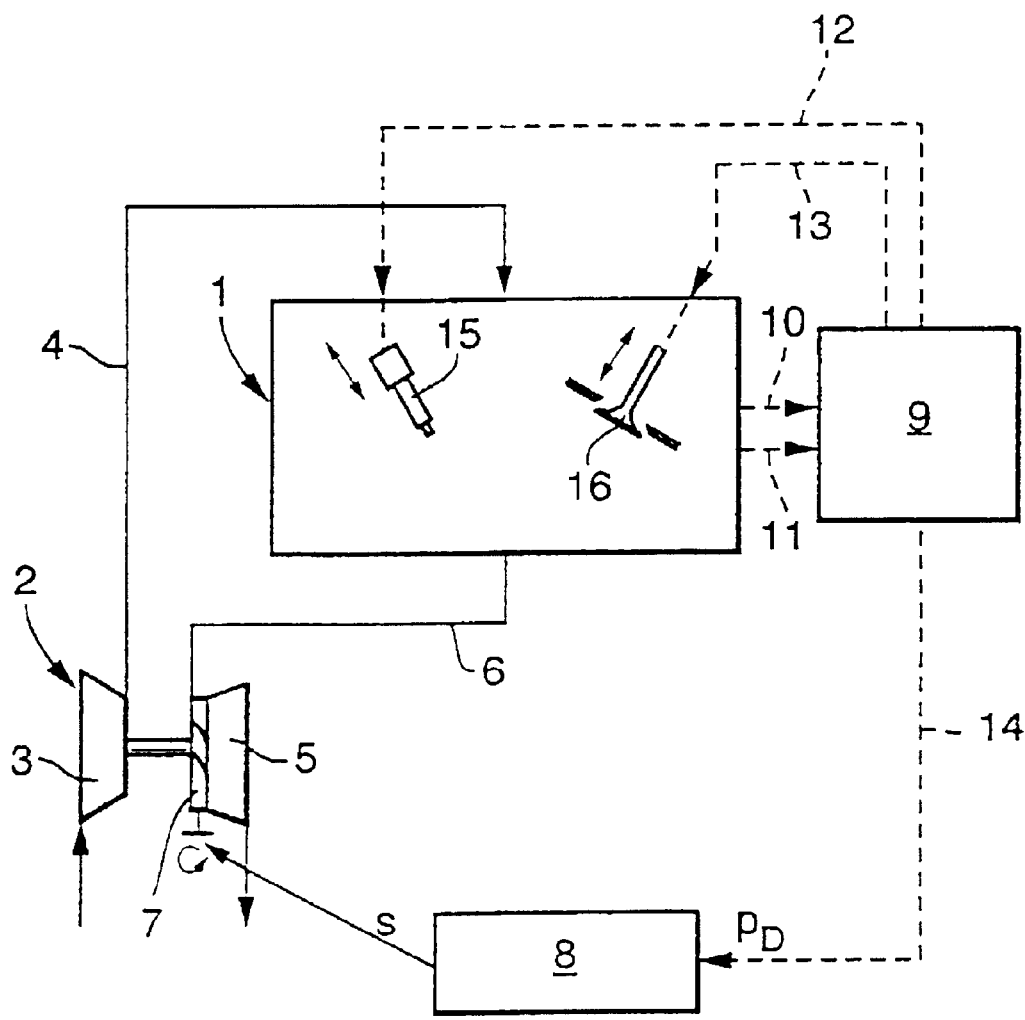
FIG. 1 shows a diagrammatic view of a supercharged internal combustion engine with supercharging pressure control.

The internal combustion engine 1 in a motor vehicle, for example a diesel internal combustion engine in a commercial vehicle, has an exhaust gas turbocharger 2 with a compressor 3 in the induction tract 4, and an exhaust gas turbine 5 in the exhaust line 6. The compressor 3, which produces a raised supercharging pressure at the cylinder inlet of the internal combustion engine 1, is connected via a shaft to the turbine 5, which is driven by the exhaust gas flow of the internal combustion engine.

The turbine 5 is fitted with a variable, adjustable turbine geometry, which is designed in the exemplary embodiment as a radial guide cascade 7 with adjustable guide vanes and is set by an actuator 8 to the desired guide cascade position. As an alternative to a radial guide cascade, the variable turbine geometry can also be implemented as an axial slide. Use is also made, if appropriate, of flap turbines or other types of variable turbine which permit variable adjustment of the active turbine cross section or, in some other way, permit the exhaust mass flow striking the turbine impeller to be influenced.

The vehicle is subordinate to an engine regulation and control system 9 for regulating and controlling the driving and operating states of the internal combustion engine 1, the exhaust gas turbocharger 2 and, if appropriate, further components such as gearbox etc. The engine regulation and control system 9 communicates with various engine components via signal lines 10 to 14. Via the signal lines 10, 11, the engine regulation and control system 9 receives engine state variables and engine operating variables as input signals, in particular the engine load $M_L$ and the engine speed n. In accordance with a stored transformation rule, for example a control law, and as a function of stored characteristic diagrams, the engine regulation and control system 9 generates from the input signals output signals which are fed to the engine components to be set via further signal lines 12, 13, 14. The engine regulation and control system 9 controls the mode of operation of the injection nozzles 15 and of the valves 16 of the internal combustion engine 1 via the signal lines 12, 13. The actuator 8 is fed via the signal line 14 a control pressure $P_D$ which is converted in the actuator 8 into an actuating travel s for setting the variable turbine geometry.

Figure 2:
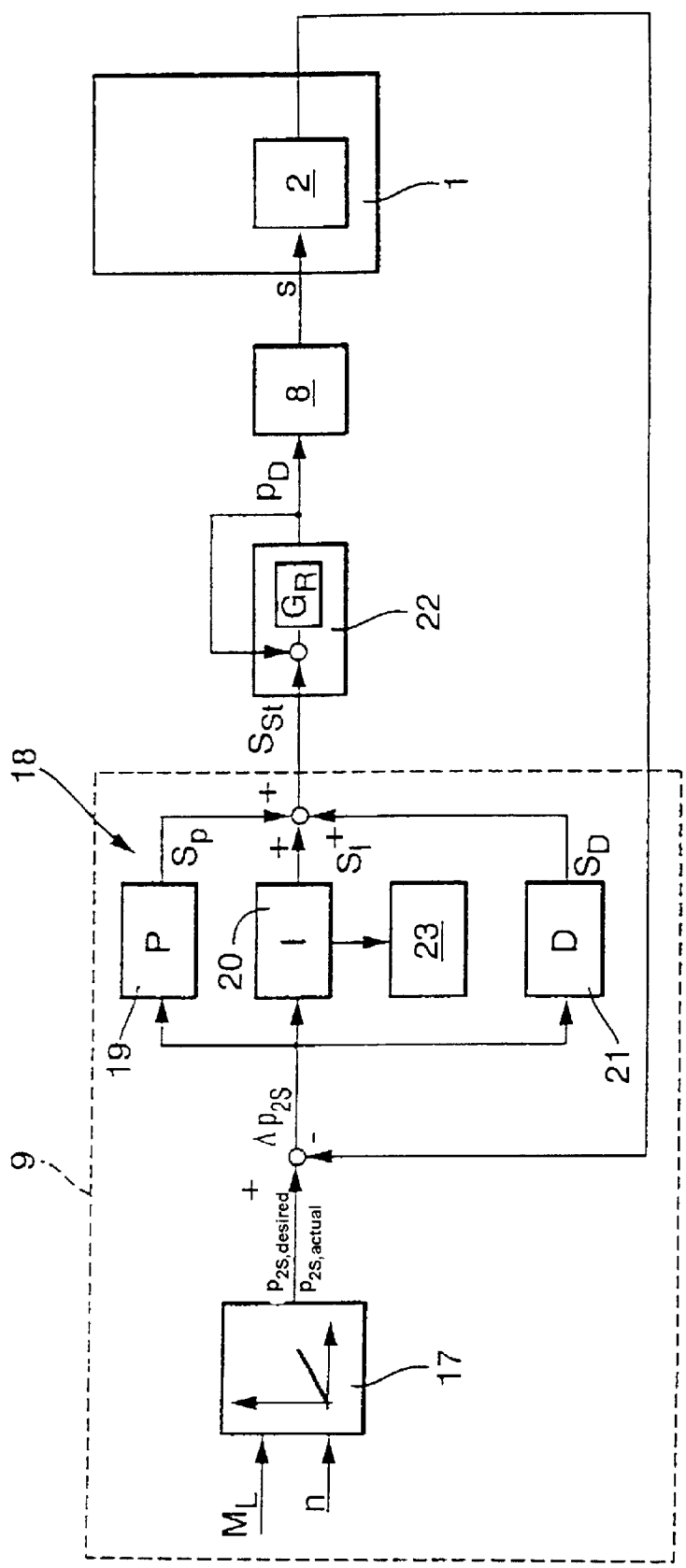
FIG. 2 shows a block diagram of a supercharging pressure controller.

The control system of the exhaust gas turbocharger 2 is illustrated in the block diagram in accordance with FIG. 2. The engine control and regulation system 9 comprises a characteristic diagram 17 and a PID controller 18 which is composed additively of the individual components of proportional element 19, integral element 20 and derivative-action element 21. The engine control and regulation system 9 is fed as input signals the engine load $M_L$ and the engine speed n, from which the desired supercharging pressure $p_{2S,desired}$ for the induction tract of the internal combustion engine downstream of the compressor is read out in the characteristic diagram 17. The system deviation $\Delta p_{2S}$, which is fed as input signal to the PID controller 18, is formed from the desired supercharging pressure $p_{2S,desired}$ by subtracting the measured actual supercharging pressure value $p_{2S,actual}$. In accordance with the control law $$S_{St} = S_P + S_I + S_D$$

the PID controller supplies the pulse-width-modulated actuating signal $S_{St}$, comprising the components $S_P$, $S_I$ and $S_D$ which are assigned to the individual elements 19, 20, 21 of the controller and are determined from the components of the PID controller in accordance with the relationships $$S_P = K_P * \Delta p_{2S}$$

$$S_I = K_I * p_{2S}^{dt}$$

$$S_D = K_D * d/dt(\Delta p_{2S})$$

Here, $K_P$, $K_I$ and $K_D$ denote gains of the proportional element 19, the integral element 20 and the deviate-action element 21, respectively.

The actuating signal $S_{St}$ is fed as input signal to a transducer 22 in which a control pressure $P_D$ is generated as output signal.

It can be expedient to subordinate the transducer 22 to a controller $G_R$, in order to compensate fluctuations in the pressure supply so that pressure fluctuations cannot affect the control pressure $p_D$ generated.

The control pressure $P_D$ is fed as input signal to the actuator 8, which generates the actuating travel s for the variable turbine geometry in the exhaust gas turbocharger 2 of the internal combustion engine 1.

The integration element 20 of the PID controller 18 is assigned a fault block 23, in which continuous checking of the operating state of the internal combustion engine is undertaken with the aid of the integration component $S_I$ of the PID controller, and with the aid of the system deviation $Dp_{2S}$, and any faults occurring are recorded. The design and mode of operation of the fault block 23 is illustrated in detail in FIG. 3.

Figure 3:
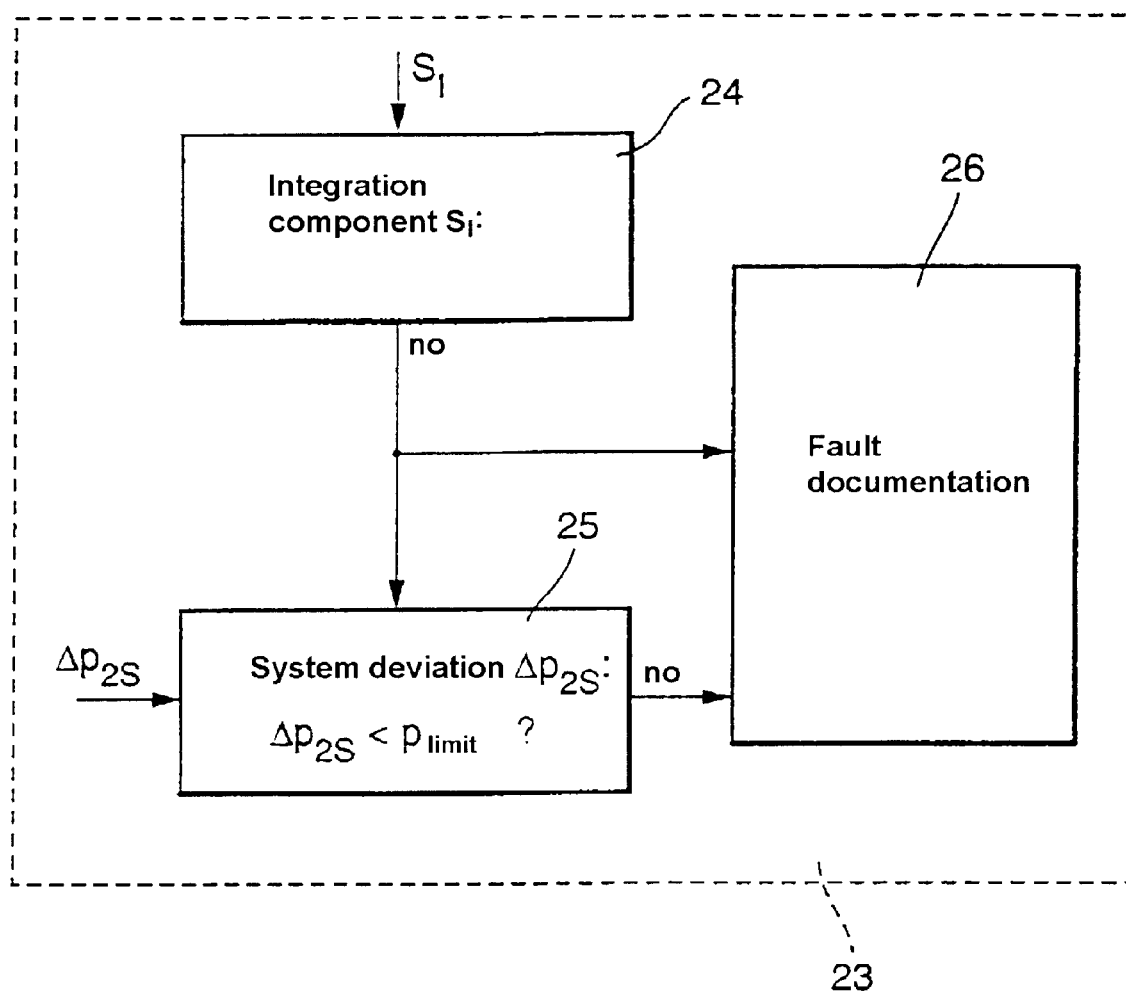
FIG. 3 shows a flowchart for checking faults.

In accordance with FIG. 3, the fault block 23 comprises a plurality of processing and memory units 24 to 26. In a first processing unit 24, a check is made as to whether the integration component $S_I$ generated in the integration element 20 is within a tolerance band which is bounded by a lower, prescribable tolerance value $Tol_{min}$ and an upper, prescribable tolerance value $Tol_{max}$.

If the integration component $S_I$ is within the tolerance band, no defective operating state is present. In accordance with a first design, the fault checking can be broken off and the closed-loop control can be continued. In accordance with a second design, the fault checking can also be continued for the case in the downstream processing unit 25 when the integration component $S_I$ is within the prescribed tolerance band.

If the integration component $S_I$ is outside the tolerance band, a defective operating state is present. The fault is documented in a memory unit 26 by inputting the integration component $S_I$ and the current point in time, and also displayed, if appropriate.

In the case of a fault, it is expedient to continue the checking in the downstream processing unit 25, in which it is asked whether the system deviation $\Delta p_{2S}$, which must vanish when use is made of an integration element, is smaller than a given limit value $P_{limit}$. No fault is present if this is the case. By contrast, if the system deviation $\Delta p_{2S}$ is larger than the limit value $P_{limit}$, the controller is not capable of adjusting the supercharging pressure to the prescribed desired supercharging pressure, and a lasting system deviation is present. Dynamic transient phenomena are to be taken into account in this case, since a lasting system deviation can be detected with adequate reliability only in the stationary operating state. In order to be able to exclude non-stationary processes, it is expedient to investigate the system deviation $Dp_{2S}$ in a plurality of consecutive cycles.

In the case of an impermissibly high system deviation, a fault is input into the memory unit 26.

It can be appropriate to undertake the fault checking in the two processing units 24 and 25 in a fashion independent of one another in each case.

It can also be appropriate to use a PI controller instead of a PID controller. This is achieved by setting the gain $K_D$ of the derivative-action element 21 to zero.

The integration component $S_I$ is expediently represented as an integrator sum which can be determined by numerical iteration, and is taken as the basis for the comparison with the tolerance band. Since the integrator sum increases continuously with time, the tolerance band must be updated continuously in accordance with the current point in time.

What is claimed is:

1. A control method for a supercharged internal combustion engine, in which actual supercharging pressure values ($p_{2S,actual}$) are adjusted to prescribe desired supercharging pressure values ($p_{2S,desired}$) by setting a variable component, influencing the supercharging pressure of a supercharger in accordance with a prescribed control law, comprising the steps of:

using a PID controller having an integration component, a proportional component and a derivative component, said PID controller functioning as said prescribed control law, and comparing said integration component with a prescribed tolerance band ($Tol_{min}$, $Tol_{max}$); and generating a fault signal if the integration component is outside the tolerance band ($Tol_{min}$, $Tol_{max}$).

2. The control method according to claim 1 further comprising the steps of:

forming a system deviation ($\Delta p_{2S}$) between the desired supercharging pressure value ($p_{2S,desired}$) and the actual supercharging pressure value ($P_{2S,actual}$); and generating a fault signal if the system deviation ($\Delta p_{2S}$) exceeds a defined limit value ($p_{limit}$).

3. The control method according to claim 2 further including the step of monitoring the integration component ($S_I$) and the system deviation ($\Delta p_{2S}$).

4. The control method according to claim 2 including the steps of representing the integration component ($S_I$) approximately as an integrator sum, and comparing the integrator sum with the tolerance band ($Tol_{min}$, $Tol_{max}$).

5. The control method according to claim 2 including the step of storing a generated fault signal in a engine regulation and control system.

6. The control method according to claim 2 including the step of controlling the supercharging pressure as a function of a load ($M_L$) and engine speed (n).

7. The control method according to claim 2 including the step of setting the derivative component element of the PID controller to zero.

8. The control method according to claim 1 further including the step of monitoring the integration component ($S_I$) and the system deviation ($\Delta p_{2S}$).

9. The control method according to claim 8 including the steps of representing the integration component ($S_I$) approximately as an integrator sum, and comparing the integrator sum with the tolerance band ($Tol_{min}$, $Tol_{max}$).

10. The control method according to claim 8 including the step of storing a generated fault signal in a engine regulation and control system.

11. The control method according to claim 8 including the step of controlling the supercharging pressure as a function of a load ($M_L$) and engine speed (n).

12. The control method according to claim 8 including the step of setting the derivative component element of the PID controller to zero.

13. The control method according to claim 1 including the steps of representing the integration component ($S_I$) approximately as an integrator sum, and comparing the integrator sum with the tolerance band ($Tol_{min}$, $Tol_{max}$).

14. The control method according to claim 13 including the step of storing a generated fault signal in a engine regulation and control system.

15. The control method according to claim 13 including the step of controlling the supercharging pressure as a function of a load ($M_L$) and engine speed (n).

16. The control method according to claim 1 including the step of storing a generated fault signal in a engine regulation and control system.

17. The control method according to claim 16 including the step of controlling the supercharging pressure as a function of a load ($M_L$) and engine speed (n).

18. The control method according to claim 1 including the step of controlling the supercharging pressure as a function of a load ($M_L$) and engine speed (n).

19. The control method according to claim 1 including the step of setting the derivative component element of the PID controller to zero.

20. The control method according to claim 1 wherein the supercharger is an exhaust gas turbocharger with a compressor and an exhaust gas turbine having a variable turbine geometry, and wherein the actual supercharging pressure values ($P_{2S,actual}$) are adjusted to the desired supercharging pressure values ($P_{2S,desired}$) by setting the variable turbine geometry.

* * * * *